United States Patent [19]

Niehaus

[11] Patent Number: 5,195,408

[45] Date of Patent: Mar. 23, 1993

[54] BAR FEEDER WITH CENTERING APPARATUS

[75] Inventor: John Niehaus, Indianapolis, Ind.

[73] Assignee: Westboro Engineering Company, Inc., Indianapolis, Ind.

[21] Appl. No.: 770,014

[22] Filed: Sep. 30, 1991

[51] Int. Cl.$^5$ .............................................. B23B 15/00
[52] U.S. Cl. ...................................... 82/127; 29/37 R
[58] Field of Search ................................. 82/124-127, 82/102, 170, 162, 164, 903; 29/37 R; 226/19

[56] References Cited

U.S. PATENT DOCUMENTS

| | | | |
|---|---|---|---|
| 1,871,077 | 8/1932 | Mowat | 82/124 X |
| 3,527,126 | 9/1970 | Jones, Jr. | 82/127 |
| 3,677,114 | 7/1972 | Brochard et al. | 82/127 |
| 3,696,696 | 10/1972 | Bechler | 82/127 |
| 3,941,256 | 3/1976 | Doe et al. | 82/126 X |
| 4,068,546 | 1/1978 | Werkmeister | 82/127 X |
| 4,289,051 | 9/1981 | Ramunas | 82/127 X |
| 4,407,176 | 10/1983 | Link | 82/127 |
| 4,413,939 | 11/1983 | Peris | 82/127 |
| 4,875,396 | 10/1989 | Gathings | 82/127 X |
| 4,953,429 | 9/1990 | Arisaka et al. | 82/127 |
| 4,961,358 | 10/1990 | Goda | 82/127 |

FOREIGN PATENT DOCUMENTS

| | | | |
|---|---|---|---|
| 608490 | 11/1960 | Canada | 82/125 |
| 623041 | 7/1961 | Canada | 82/125 |
| 31538 | 3/1980 | Japan | 82/125 |
| 208802 | 9/1987 | Japan | 82/124 |
| 150101 | 6/1988 | Japan | 82/124 |
| 481401 | 8/1975 | U.S.S.R. | 82/125 |
| 2072546 | 10/1981 | United Kingdom | 82/125 |

Primary Examiner—Z. R. Bilinsky
Attorney, Agent, or Firm—Woodard, Emhardt, Naughton, Moriarty & McNett

[57] ABSTRACT

A holder for bar stock being fed to a turning machine includes bar stock holding V-shaped trough, and a top guide assembly mounted to a floor-mounted frame through frame-mounted slides that are vertically slidable on the frame in opposite directions. A horizontally-extending adjusting-cam rail is horizontally slidably mounted to the frame. It has inclined keys thereon received in keyways in horizontal cylinders mounted in the vertically movable slides so that, upon linear adjustment of the cam rail, the trough mounting slides and the guide mounting slides are vertically moved simultaneously but in opposite directions to adapt the apparatus to different sizes of stock, but without changing the location of the centerline of the stock to be fed to the turning machine. A handwheel operated screw adjusts the cam rail. A parallelogram linkage and operating handle provide for quick guiding control of new stock after loading into the trough from above the trough. A stock pusher rod is driven by an air driven roller chain.

15 Claims, 9 Drawing Sheets

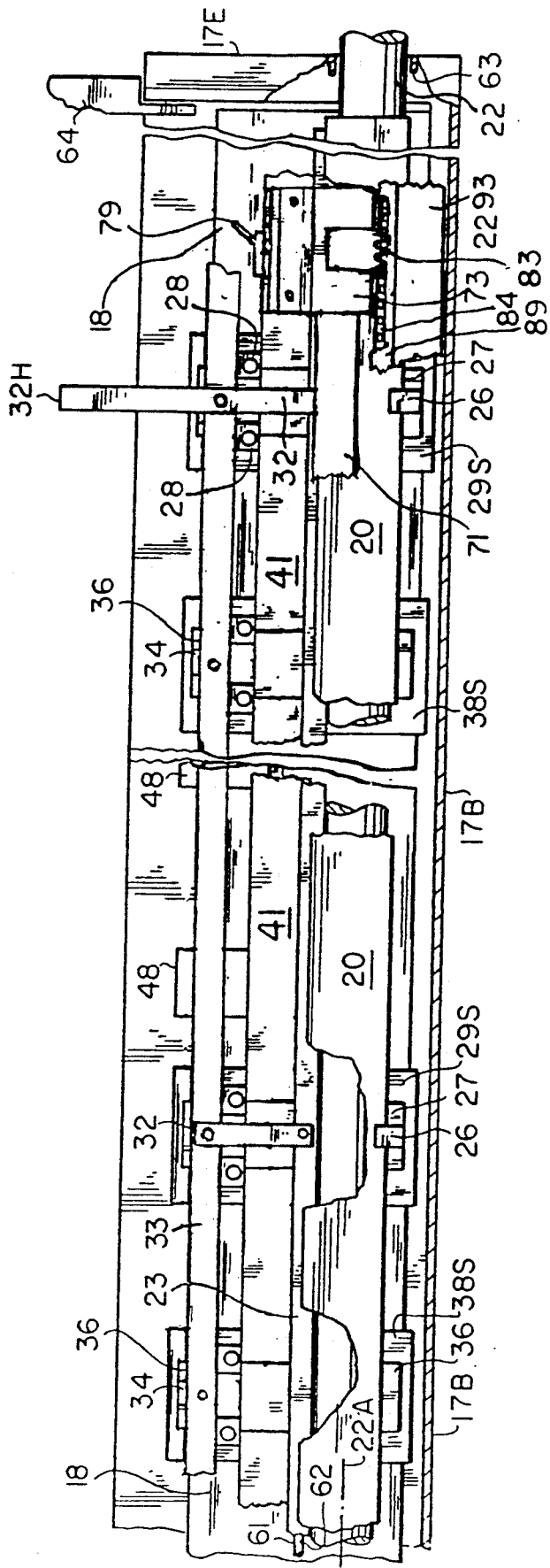

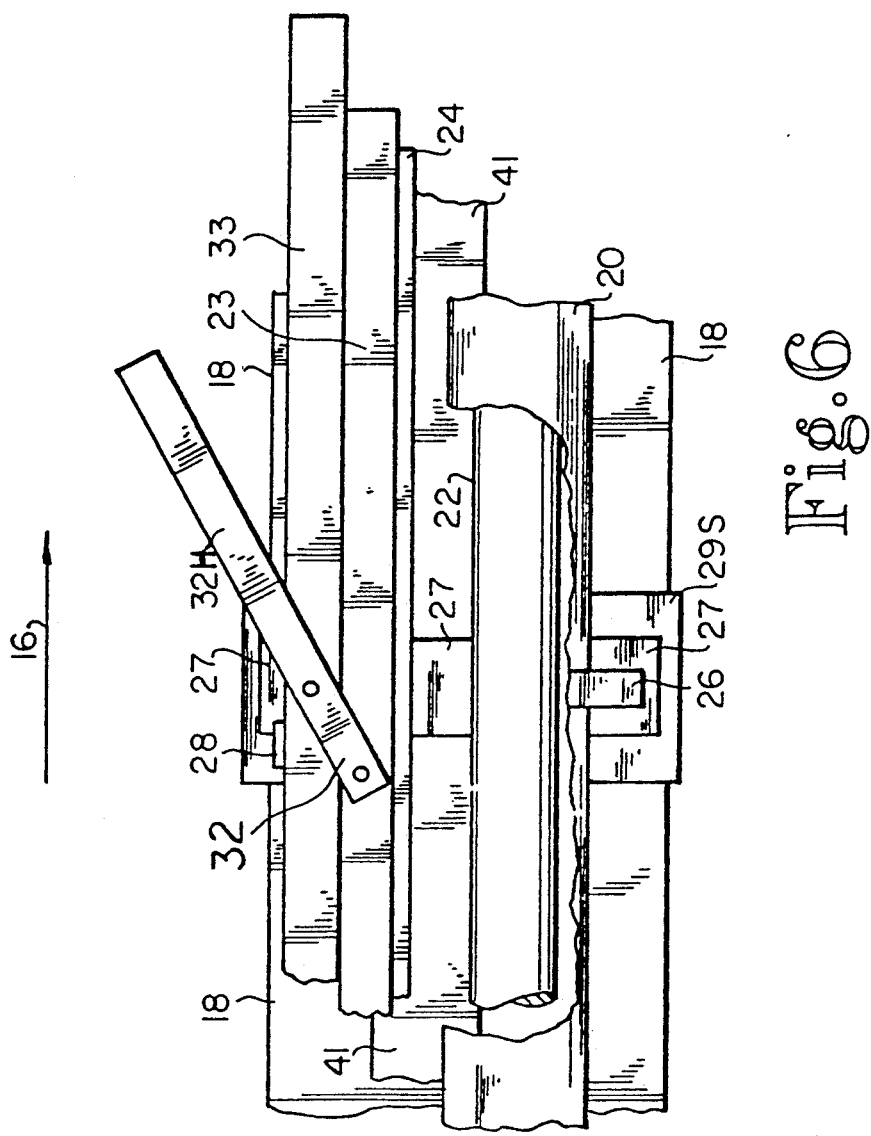

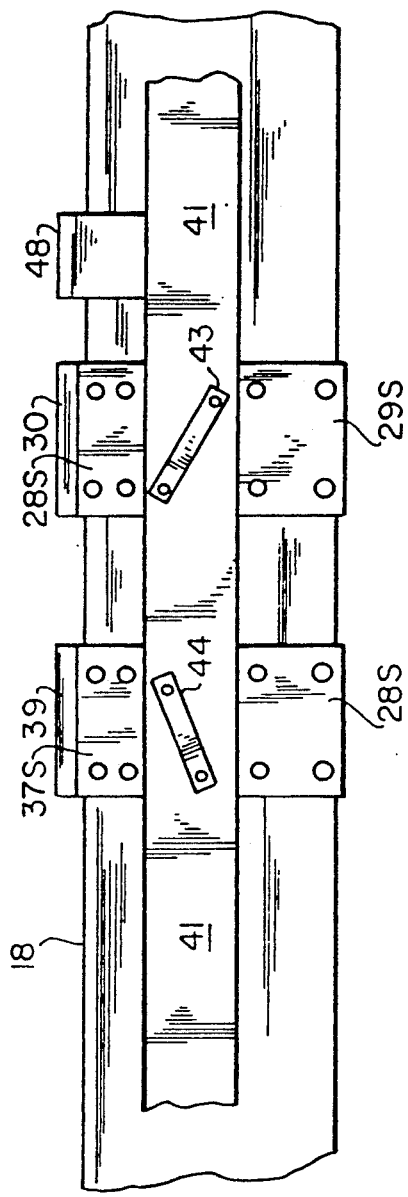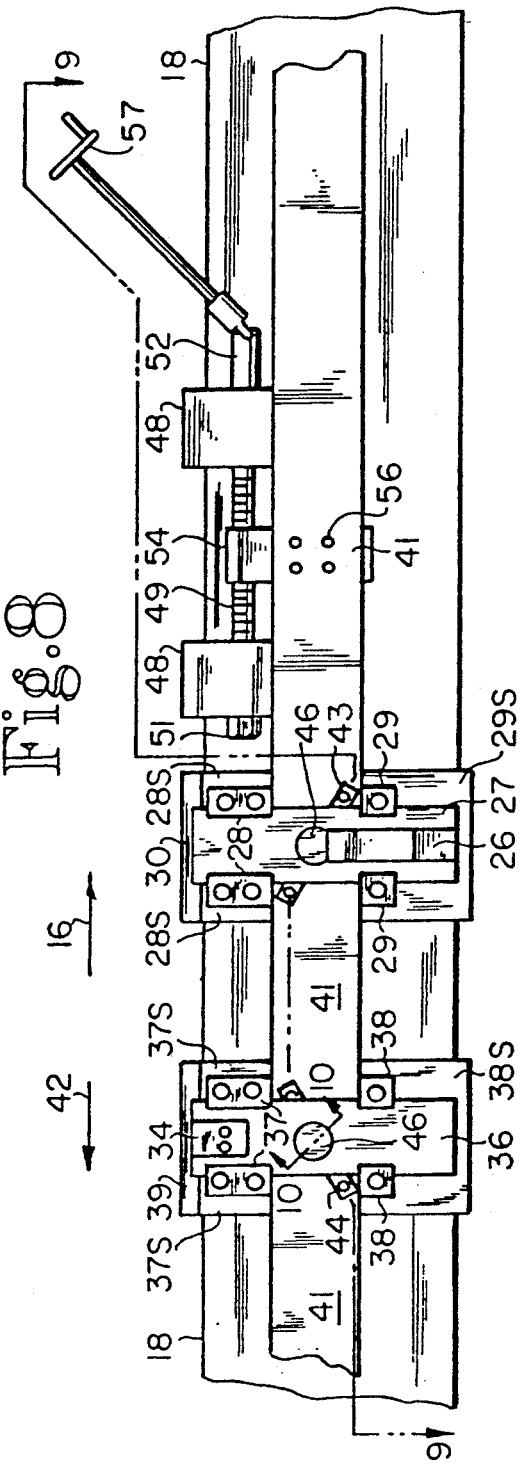

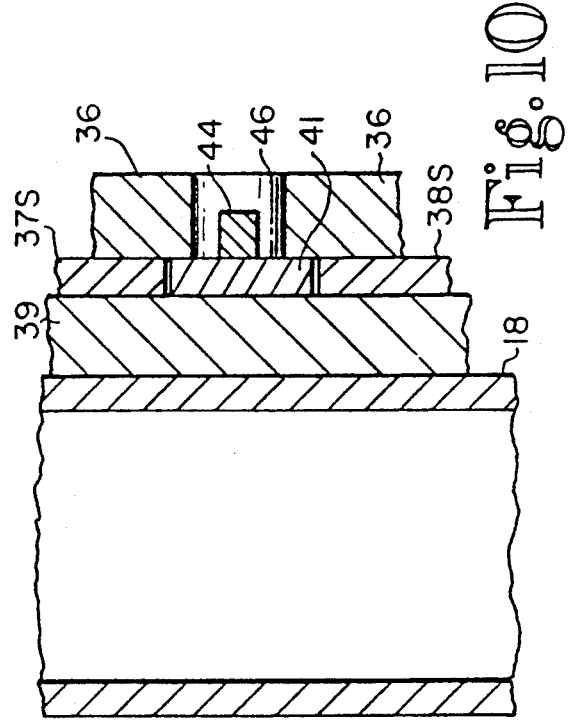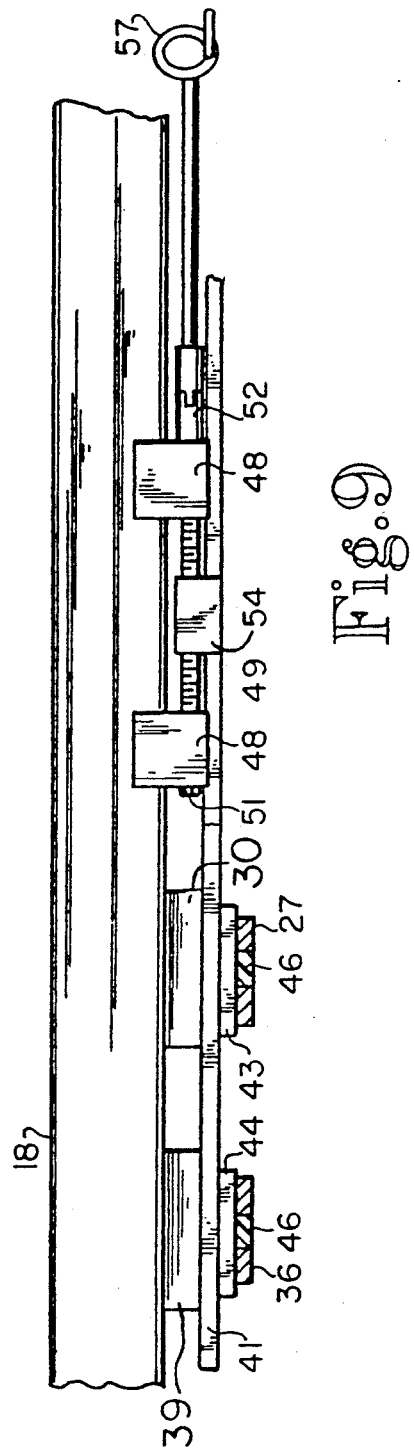

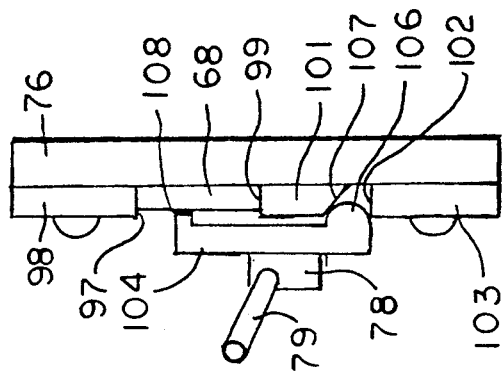
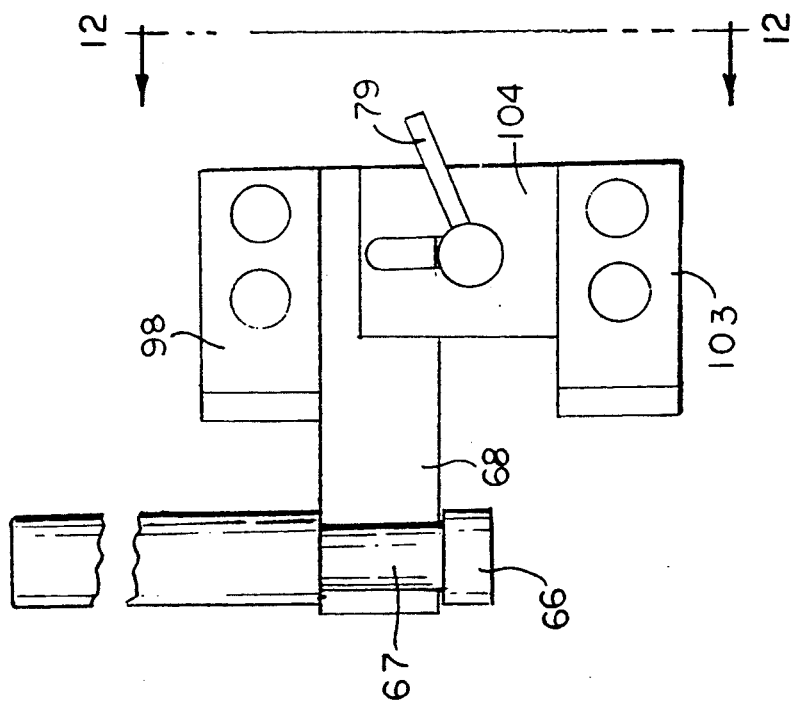

BAR FEEDER WITH CENTERING APPARATUS

BACKGROUND OF THE INVENTION

1. Field of the Invention

This invention relates generally to devices for feeding bar stock to processing equipment, and more particularly to a feeder for bar stock to a turning machine such as an automatic lathe, for example.

2. Description of the Prior Art

It is important that the centerline of bar stock fed to a turning machine such as an automatic lathe, for example, be aligned with the centerline of the lathe spindle. Since the stock spins while being processed, it is important to limit radial free play of the stock, to avoid whipping, vibration and other undesirable action of the stock in the feeder. It is also desirable to be able to accommodate quick changes of bar cross sectional size, while maintaining alignment of the stock centerline with the spindle centerline.

In some conventional designs of bar stock feeders, the bar is supported in a tube which must be swung out from operating position in order to load the bar stock from the front end. This requires significant floor space. Also, the impact of returning the tube to its operating position can cause the alignment with the turning machine to be adversely affected. U.S. Pat. No. 4,953,429 to Arisaka et al. for Apparatus for Rotatably Supporting and Feeding Elongated Rod Member schematically shows some such prior art arrangements in FIGS. 10 (a) and 10 (b).

As stated in its abstract, the U.S. Pat. No. 4,289,051 to Ramunas for an Object Centering and Moving Mechanism describes a mechanism to raise a round or hexagonal object to establish its center on a fixed reference line, regardless of the object's diameter. First and second calipers engage opposite sides of each object which senses its diameter. Simultaneously, the calipers act through a lever with a two-to-one mechanical advantage so that a stop on the linkage coacts with a fixed frame. The calipered diameter of the object determines the positioning of the stop relative to the frame so that the center of the object is on a fixed reference line regardless of the object's diameter.

The Goda U.S. Pat. No. 4,961,358 for Apparatus for Feeding Elongated Material describes an apparatus which includes plurality of longitudinally spaced support members 6. Each of the support members includes a workpiece contact and guide ring 8, and each guide ring is pivotable on a horizontal axis perpendicular to the length of the material being fed. In this manner, the support members can be pivoted to accommodate and center workpieces of differing diameters (see particularly FIG. 9 which shows material 31 being fed through a support member contact ring 8).

The Peris U.S. Pat. No. 4,413,939 for a Bar Stock Feeder describes a bar stock feeding apparatus having both horizontal and vertical adjustment. Vertical adjustment is accomplished by turning threaded vertical adjusting posts (20 and 30 in FIG. 1) on the rear and front of the carrier assemblies.

The Brochard et al. U.S. Pat. No. 3,677,114 for Positioning The Work in a Milling Lathe describes a milling lathe which has driving rollers (4) connected to vertically movable cross pieces (6) in which are mounted nuts (7a and 7b). A vertical screw (8) with two threads (8a and 8b) having opposite pitch extends through the nuts of the cross pieces. Thus, turning the screw (8) causes movement of the cross pieces and thus the rollers toward or away from the axis of the bar in a symmetrical manner.

Additional patents of general interest are U.S. Pat. No. 3,527,126 to Jones, Jr. for Stock Feeding Apparatus with Chain Device; U.S. Pat. No. 4,875,396 to Gathings for Apparatus for Feeding Bar Stock to a Machining Operation; U.S. Pat. No. 3,696,696 to Bechler for Bar Feed for Automatic Lathe; and U.S. Pat. No. 4,068,546 to Werkmeister for Feed Apparatus for Screw Machine. Among the aforementioned patents. the Arisaka et al. patent also shows oil supplying means and damper means spaced along the stock.

There has remained a need for a feeder which is open at the top to receive bar stock, which adequately supports and centers virtually the entire length of the bar stock being fed to the turning machine and which can be readily adjusted to accommodate different cross-sectional dimensions of bar stock.

SUMMARY OF THE INVENTION

Described briefly, according to a typical embodiment of the invention, a bar stock holder trough and top guide member are mounted on slides that are vertically movable in opposite directions on a floor-mounted frame. A cam and follower system is associated with the frame and slides so that, upon operation of a single horizontal slide, all of the cams and followers are operated to simultaneously move the trough and top guide vertically in opposite directions to increase or decrease the vertical spacing between the trough and the top guide to accommodate greater or lesser cross-sectional sizes of stock. Quick release rail and link means enable release of unused stock and replacement with additional stock or stock of a different size from directly above the holder and without swinging the holder horizontally or requiring endwise insertion of the stock into the holder. A stock pusher is driven by an endless chain to move stock along the trough.

BRIEF DESCRIPTION OF THE DRAWINGS

FIG. 5 is a fragmentary side elevational view of the feeder, on a scale between those of FIGS. 1 and 2, with a portion broken away from the middle and left-hand end to conserve space in the drawing, and showing two sets of vertical slides which support and guide the stock.

FIG. 6 is a fragment of the view of FIG. 5 but showing the stock top guide member in the release position.

FIG. 7 is a fragmentary elevational view similar to FIG. 5 but omitting the stock support trough, top guide mount, top guide and guide mount links, to show interior details.

FIG. 8 is a view similar to FIG. 7 but with the guide mount slide omitted to show the guide adjustment cam key and the trough adjustment cam key on the adjuster slide.

FIG. 9 is a fragmentary top plan and sectional view of the device taken at line 9—9 in FIG. 7 and viewed in the direction of the arrows.

FIG. 10 is an enlarged section taken at line 10—10 in FIG. 7 and viewed in the direction of the arrows.

FIG. 11 is a view of the pusher blade and clamp portion of the carriage assembly taken at line 11—11 in FIG. 2 and viewed in the direction of the arrows.

FIG. 12 is a view thereof taken at line 12—12 in FIG. 11 and viewed in the direction of the arrows.

DESCRIPTION OF THE PREFERRED EMBODIMENT

Figure 1:
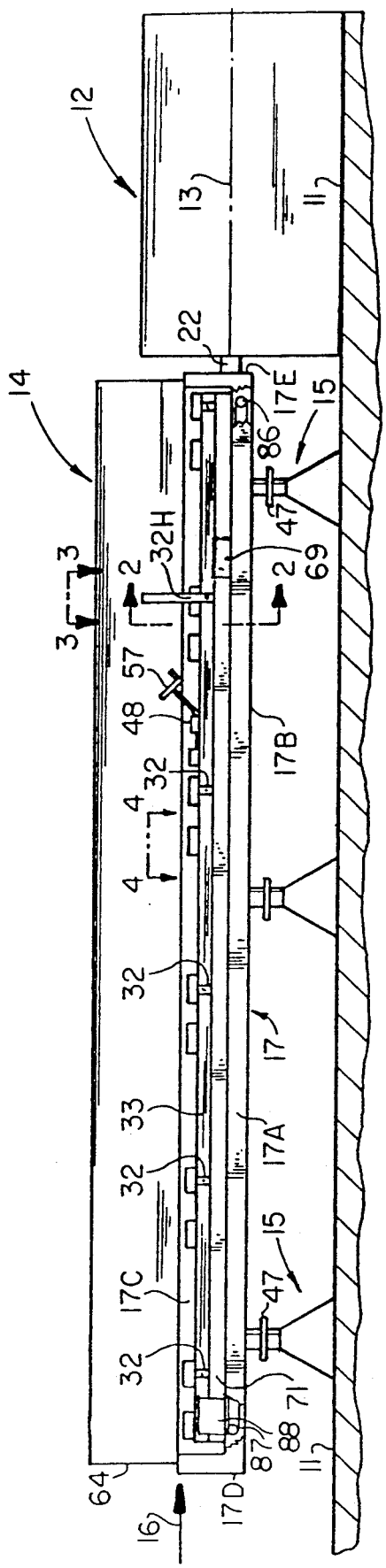
FIG. 1 is a diagrammatic elevational view of a combination turning machine and feeder according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The shop floor is shown at 11 and supports a turning machine 12 having a horizontal axis 13 on which the machine receives and turns the workpiece as the machine performs various functions such as drilling, turning, grooving, and cutting off pieces from the workpiece which is supported and fed into the machine by the feeder 14 of the present invention, and which is supported above the floor 11 by suitable legs 15 of any suitable nature. In this example, the bar stock is fed into the machine from the left to the right in the direction of the arrow 16.

Figure 2:
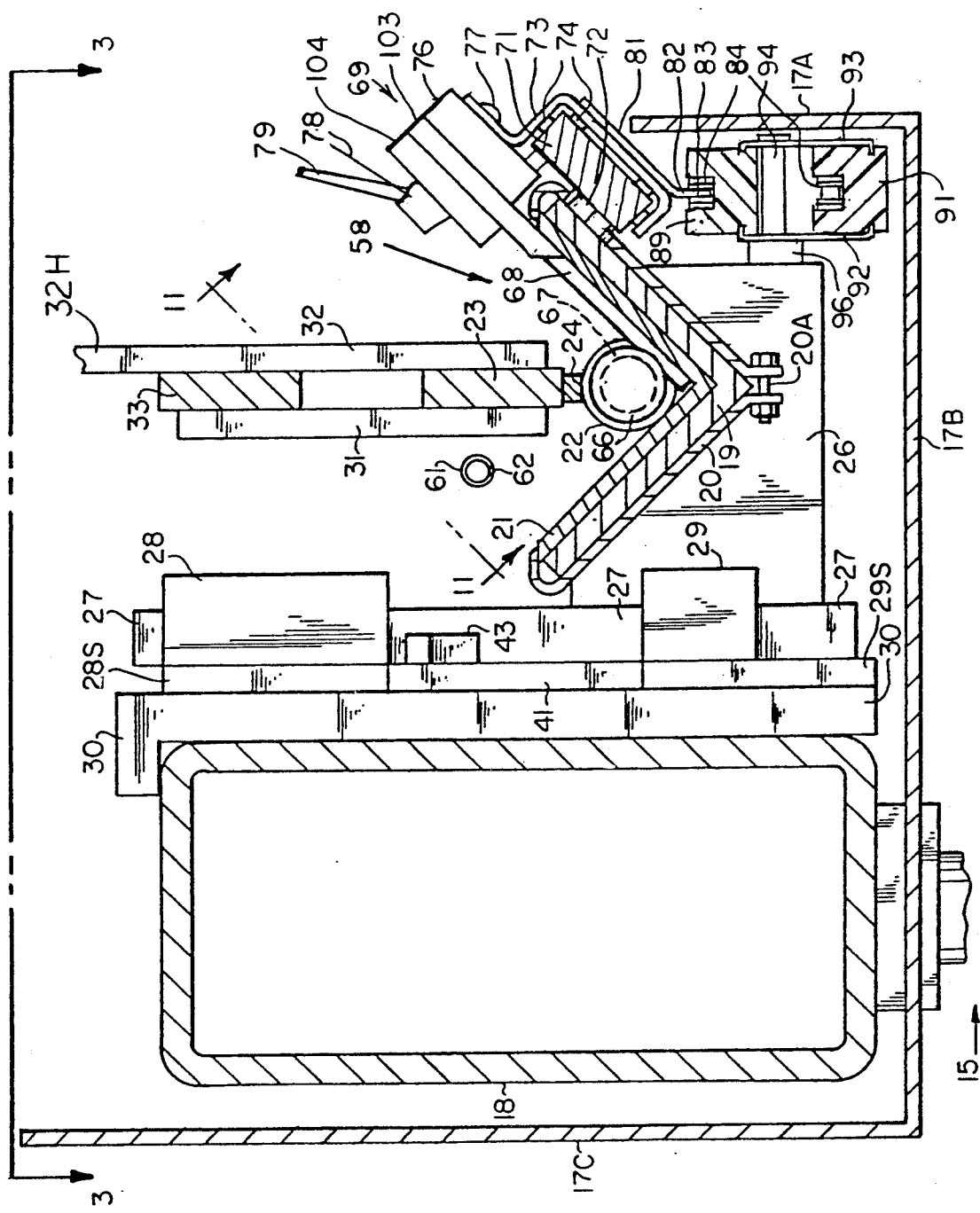
FIG. 2 is an enlarged cross-sectional view through the feeder taken at line 2—2 in FIG. 1 and viewed in the direction of the arrows.
Figure 3:
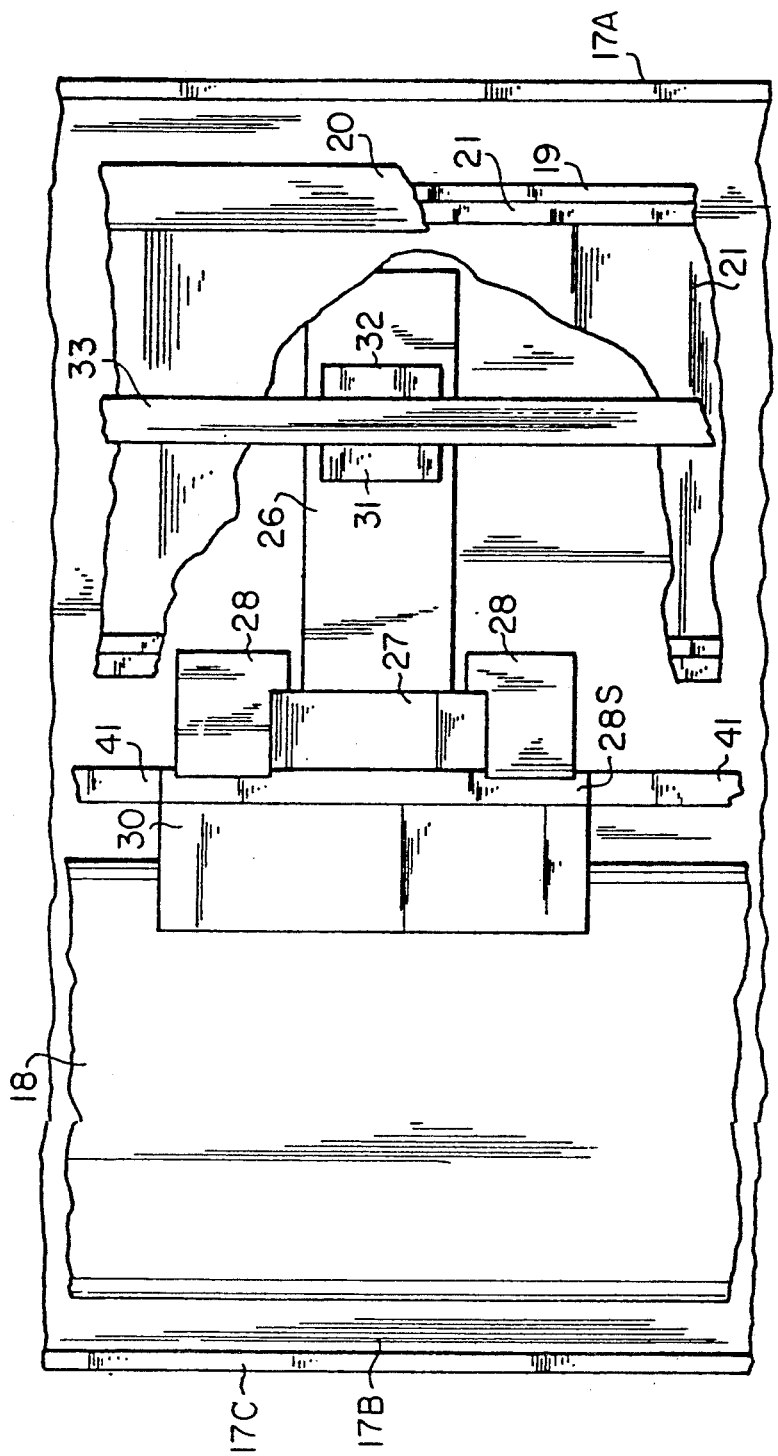
FIG. 3 is a fragmentary top plan view taken at line 3—3 in FIGS. 1 and 2 and showing the adjuster holder and slide.
Figure 4:
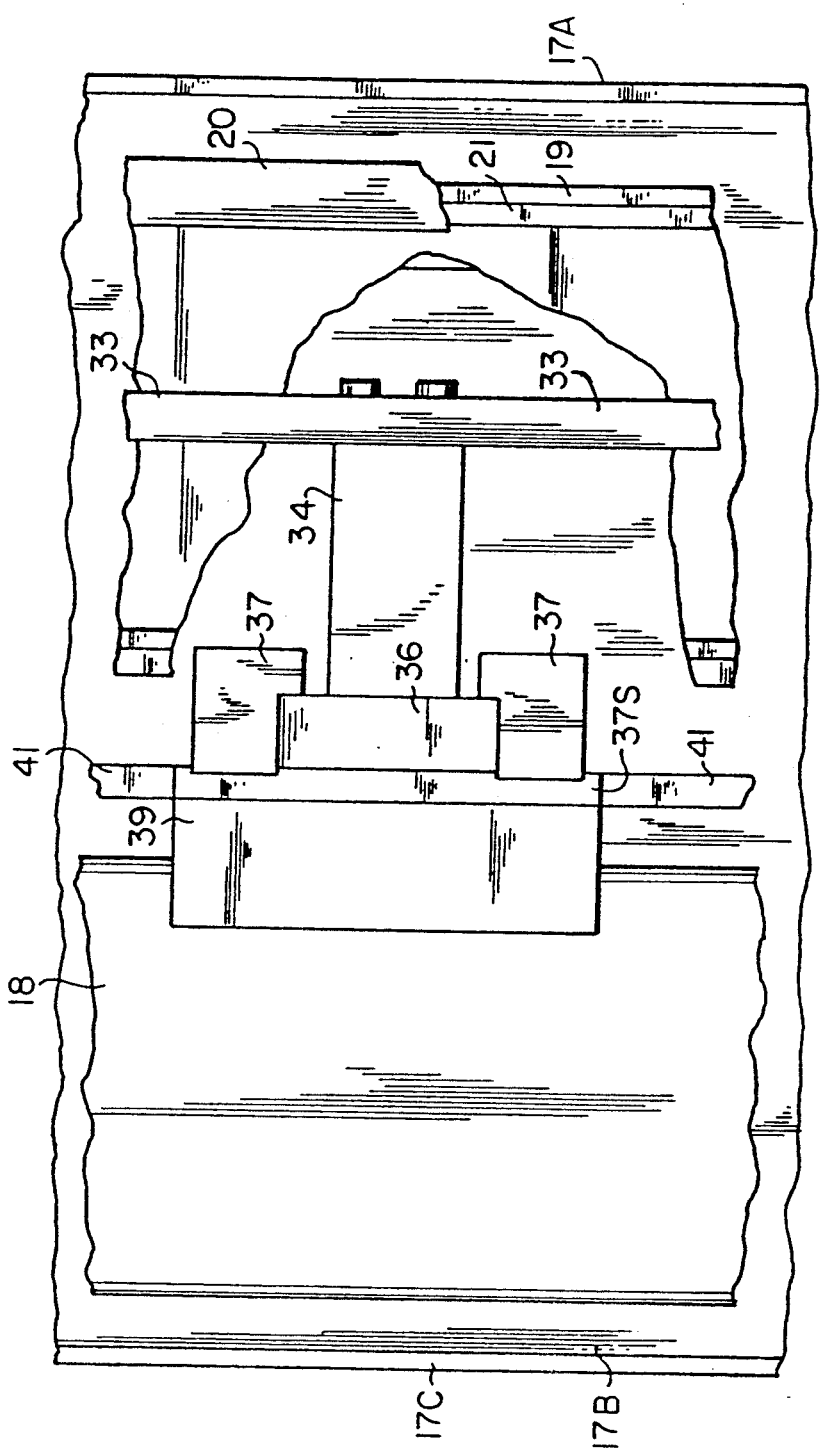
FIG. 4 is a fragmentary top plan view taken at line 4—4 in FIG. 1 and viewed in the direction of the arrows.

Referring now to FIGS. 1, 2 and 5, the feeder includes an elongate lubricant-containing tub 17 supported on and sealed to the legs 15 and having a low front wall 17A, bottom 17B, high rear wall 17C and closed ends 17D and 17E. A structural steel tube 18 is supported on the legs 15 and extends the length of the feeder. This tube supports a trough 19 which is V-shaped in cross-section. A two-piece trough liner retainer 20 secures a trough liner 21 in the trough to support the workpiece bar stock 22. Each half of the retainer 20 has an inturned flange at the top and an apertured flange at the bottom. Bolts 20A are received in the longitudinally spaced apertures in the bottom flange and, when tightened, pull the pieces down the slope of the trough bottom, and the top flanges engage the top edges (FIG. 8) of the liner and pull the liner snugly into the bottom of trough 19. A top guide rail 23 is also supported by the tube 18 and has a wear strip 24 on its bottom surface and which contacts the top of the bar stock and holds it against the liner 21.

More specifically, the trough 19 is supported by a plurality of horizontally spaced brackets 26. Each of these is bolted to a slide 27. This slide is received in a trough slide guide combination which includes a pair of upper guides 28 and a pair of lower guides 29. These four guides are bolted through upper and lower spacer plates 28S and 29S (FIGS. 2 and 8) to a base plate 30 which is bolted to the tube 18.

As mentioned above, a top guide assembly is employed to provide, in unison with the guide trough, a third point of contact with the circumference of the bar stock 22, to cooperate with the two points provided by the trough to thereby accurately guide the bar stock 22. This includes the guide rail 23 and the wear strip 24 on the bottom of the rail. The rail 23 extends essentially the length of the feeder and is mounted by links 31 and 32, both of which are pinned or pivotally mounted to a guide mount bar 33. This mount bar 33 is supported by cantilever brackets 34 (FIGS. 4 and 7) bolted to guide slides 36, which are virtually identical (except for orientation of the keyway therein) to the trough mount slides 27. The guide mount slides are received in upper and lower pairs 37 and 38 of guides bolted through upper and lower spacer plates 37S and 38S (FIG. 8) to the guide slide base plate 39 which is bolted to the beam 18. Therefore, the vertical position of the guide rail 23 when it is in operating position as shown in FIGS. 2-5 is determined by the vertical position of the slides 36 in their guides. Similarly, the height of the trough is determined by the position of the trough mount slides 27 in their guides.

To control the height of the guide mount slides 36 and trough mount slides 27 in their guides, there is a key and keyway arrangement. More specifically, and referring to FIGS. 2, 7 and 8, there is an elongate rail 41 mounted between the lower and upper trough slide guide spacer plates 29S and 28S, respectively, and likewise located between the lower and upper guide mount slide guide spacer plates 38S and 37S, respectively. This rail or slide is longitudinally movable in the direction of arrows 16 and 42 in FIG. 7. This slide has a plurality of keys spaced along it, the number thereof being dependent upon the number of trough support brackets and guide support brackets there are spaced along the length of the feeder. For the trough slide such as 27, a key 43 is bolted to the slide 41 and is inclined downward and to the right in FIG. 8. This will be referred to herein as a positive incline with respect to the bar stock axis 22A. There is a guide adjustment key 44 bolted to the slide 41 and it is inclined upward and to the right. This will be referred to as a negative incline with respect to the workpiece bar stock axis 22A. By comparing FIG. 8 with FIG. 7, it can be seen that the key 43 is associated with and behind the trough slide 27. The key 44 is behind the guide slide 36. However, both of these slides have clearance grooves in them receiving these keys through the grooves, with about 0.015 inch clearance per side. Each of the slides such as 27 and 36 has a cylindrical pilot insert 46 with a keyway in the inboard end thereof which fittingly and slidingly receives one of the keys 43 or 44. This will be evident in reference to FIG. 7 and FIG. 10 which is a cross-section through the key 44 and corresponding key way in guide slide 36. The insert such as 46 is fittingly received and pivotable in a hole in each of the guide slides and trough mount slides 36 and 27, respectively, to maintain precise fit and location of the key with respect to the slide for any given setting, but yet permit free movement of the adjuster slide 41 in the direction of either arrow 16 or 42. Each insert is typically 1.0 inch diameter and 0.75 inch long.

From the foregoing description it can be recognized that movement of the slide 41 in the direction of arrow 16 will cause the trough mount slide 27 to move upward, and the guide mount slide 36 to move downward. The slope or amount of incline of the two keys is such that if the trough is supporting circular bar stock, it will move farther vertically than will the guide, so that the center line 22A of the bar stock will remain constant and colinear with the lathe input axis 13 regardless of the spacing needed between the guide wear strip 24 and the trough lining 21 to accommodate different sizes of bar stock. In this manner, when the height of the feeder assembly is adjusted one time by suitable height adjustment screw/nut assemblies at locations such as 47 (FIG. 1) on the legs 15 thereof so that the bar stock center line 22A is aligned with the input center line or axis 13 of the turning machine, it can remain aligned forever thereafter regardless of the size of the stock that is run.

In order to accommodate or adjust for different sizes of bar stock, an adjustment screw is provided. This is shown in FIGS. 7 and 9 where there are adjusting screw mounting brackets 48 bolted to the beam 18. An adjustment screw 49 is received through bushings in bores in the two brackets 48 and longitudinally confined by a nut 51 on one end of the screw abutting the left-hand end of the left-end bracket 48, and a combination collar and universal joint 52 abutting the right-hand end of the right-hand bracket 48, the collar being pinned or otherwise fastened to the screw 49 so it cannot move lengthwise of the screw. The threaded portion of screw 49 is threadedly received in a nut 54 which is fastened by screws 56 to the slide 41. A handwheel 57 and associated shaft is connected to the right-hand end of the universal joint 52.

If there is a need to open up the space between the trough and the guide to accommodate stock having a greater cross-sectional dimension, the handwheel 57 can be turned in whichever direction is required to move the adjusting adapter slide 41 to the left. If it is desired to reduce the spacing in order to accommodate smaller stock, the screw 49 is turned in the opposite direction causing the slide 42 to move to the right.

A tube 61 extending virtually the full length of the feeder with apertures 62 spaced along its length, dispenses a lubricating liquid in spray or mist downward into trough liner 21 and which will flow into the tub 17 for collection and recirculation through a filter and pump (not shown) to the tube 61. This serves to lubricate the workpiece as it is rotated in trough liner 21. A brush-type seal 63 mounted at the right hand end 17E of tub 17 prevents the lubricant from being splashed out the stock pass-through hole in end wall 17E. A splash cover 64 (shown open in FIG. 1) is hinged to the tub back wall 17C can be pulled down to cover the top and front when the feeder is operating.

Referring further to FIGS. 1, 2 and 5, the pusher system for the bar stock includes a pusher rod 66 which is located in the trough behind the bar stock 22 and has a circumferential groove 67 therein which receives a pusher drive blade 68 which rests on the top of the trough liner 21 and is clamped in a stock pusher carriage 69 which is slidably mounted on the pusher carriage guide rail 71 which is fastened to the trough by screws 72 spaced along the length of the trough, with the carriage guide rail extending throughout substantially the entire length of the trough. Screws 72 extend through slightly vertically elongated holes in the liner clamp 20 so as to permit the tightening of the retainer 20 and pulling down the liner in the trough following installation of a replacement liner if the original liner becomes damaged or worn. Thus, it is not necessary to remove and reinstall the carriage guide rail 71 in order to accomodate the replacement of a trough liner. A suitable stand-off or sleeve or spacer may be used around the screw 72 to hold the carriage guide rail 71 away from the liner retainer 20 to permit such limited vertical sliding of the retainer as needed to loosen and clamp the liner into the trough.

The carriage 69 includes a generally channel-shaped bracket 73 which is slidably mounted to the carriage guide rail 71 by two horizontally spaced sets of five plastic glide buttons 74 in each set and four of which are fittingly received in apertures of the bracket 73 and the fifth of which is received in the clamp base 76. They are made of ultra-high molecular weight polyethylene to provide smooth gliding action of the carriage as it moves along the rail toward and away from the turning machine. The bracket 73 is fastened to the clamp base 76 by three horizontally spaced screws 77. A clamp operating screw 78 with handle 79 is screwed into the base 76 and can be tightened to clamp the blade 68 in the carrige 69. A tab 81 welded to bracket 73 has a foot 82 with slots providing downwardly projecting teeth 83 (FIG. 5) with the slots fitting over rollers in links in a roller chain 84 which is an endless chain running the full length of the stock holder from a forward sprocket 86 (FIG. 1) to a rear sprocket 87 driven by an air motor 88. The upper and lower flights of the endless chain are supported respectively by chain guides 89 and 91 which are made of plastic and purchased finished. These chain guides are secured in vertically spaced parallel relation to each other by a pair of retainer plates 92 and 93, and this entire combination is affixed to the trough assembly by bolting into the brackets 26 as by bolts 94 using suitable standoff spacers or washers such as at 96.

Referring now to FIGS. 11 and 12, the pusher drive blade 68 is received in a channel between the edge 97 of a guide plate 98 fastened to the base 76 and the edge 99 of a wedge 101 received between the blade 68 and the edge 102 of a guide plate 103 fastened to the base 76. A clamp plate 104 has a cylindrical rib 106 received between edge 102 and the sloped edge 107 of the wedge 101 so that when plate 104 is clamped down by turning the clamp screw 78 into the base 76, the one edge 108 of the clamp plate 104 engages the top of the blade 68 while the edge 99 of the wedge 101 clamps it tightly against the edge 97 of guide 98. Therefore, any tendency of the pusher drive blade 68 to be loose during operation is inhibited by the wedging action. For thicker stock, a thicker pusher rod 66 and pusher blade 68 can be installed easily.

In the use of the apparatus, the original set-up to establish the center line of any stock on the center line of the lathe, is done by adjustment of the leg height adjustment screws 47. Thereafter, to accommodate different sizes of stock, the adjustment screw handwheel 57 can be turned to provide the spacing desired for the diameter of stock to be turned. Then the top guide is raised by moving the handle 32H (an upper extension of line 32) 32 to the right in the direction shown by the arrow 16 in FIG. 6, to raise the top guide to the position shown in FIG. 6 where the top of the top guide rail 23 engages the bottom of the support rail or mount 33. The pusher carriage is positioned at the far left position most remote from the lathe. Then the bar stock 22 is placed in the trough by essentially a vertical motion in the direction of arrow 58 in FIG. 2. Then the handle 32 can be raised to the vertical position of FIG. 5 whereupon the guide wear strip 24 will engage the top of the bar stock about skin tight. Then the pump is started to dispense lubricant from tube 61 to flood trough liner 41 with oil. Then the carriage is advanced to contact the left hand end of the stock with the end of the pusher rod and the stock is pushed to the right into the lathe chuck where it is gripped. Then the lathe is started and the operation is commenced.

The operating sequence would be as follows:
1. Lathe collet open, stock is being pushed against work stop in lathe.
2. Movement of work stop provides feed movement of stock to new gripping position.
3. Collet closes.
4. On collet close signal from lathe, barfeed would retract pusher rod slightly. This could be accomplished by a mechanism similar to that described in U.S. Pat. No. 3,874,520, for example.
5. Lathe spindle starts, barstock is rotated, another workpiece produced.
6. Lathe spindle stops.
7. Collet opens.
8. On collet open signal from lathe, mechanism mentioned in step 4 above returns pusher to original position against rear end of barstock.
9. Stock pusher again applies feeding pressure to rear end of barstock.
10. Return to Step 1 above.

The rotation of the bar stock in oil in the trough minimizes wear. The colinear relationship of the bar stock axis and the lathe input axis avoids any offset and minimizes any tendency to vibrate. The lathe operations can continue as long as there is sufficient bar stock on which to operate. Then, when more stock is needed, the handle 32 can be moved to the position shown in FIG. 6 to open up the trough for admission of another length of bar stock. Suitable lock pins or detents are provided to hold the handle up and down, as needed. Also, safety interlocks may be provided so that any time the handle is not locked down, the lathe is shut off.

Note that, according to the construction of the present invention, the bar stock is admitted from above the trough by a motion transverse to the axis of the stock, thus avoiding the need for any end-wise loading of the feeder or turning of the feeder to accommodate loading with the bar stock.

It should be recognized that, since there is a three line support for the bar stock, and two of the lines are tangents to the trough liner, the amount of movement of the trough liner is greater than is the amount of movement of the top guide, to accommodate different bar stock diameters. The ratio depends upon the included angle in the trough, the vertical movement requirement being greater for a smaller included angle than for a larger included angle. The relative slope of the keys 43 and 44 will be therefore determined on the basis of the included angle of the trough lining. In the illustrated example where the included angle is 90°, the ratio is 1.415 to 1.

It should be understood that the feeder of the present invention is also useful in connection with hollow as well as solid bar stock. Also, the adjustment to accommodate different diameters of bar stock, while achieved by the cam and cam follower action of the keys on the slide 41 and key ways in the inserts such as 46 in slides 27 and 36, might be accomplished by other means. Sector gears attached to pivot arms provide one example. The machine of the present invention is also adaptable to cross-sectional shapes of bar stock other than circular. For example, stock of hexagonal cross section can be placed in a round holder tube having an internal diameter which is a slip fit larger than the maximum dimension across the points of the hex. The end of the holder tube would have a hexagonally apertured cap on it with the stock slip fittingly received through it, for rotational drive of the stock. The holder tube would be held in the trough just as is round solid bar stock. A bar puller would be used in the turning machine to pull the stock through the tube when the machine completes work on one piece and is ready to begin work on the next piece.

The material used for the liner and the guide wear strip and the key following buttons 46 may be an ultra-high molecular weight polyethylene. It is preferable to provide a feeder long enough to handle industry standard 12 foot lengths of bar stock. In such an example, the trough length is about 16 feet and the supports are provided at 3 foot spacings.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. Holder apparatus for elongate stock while feeding to a processing station having an input axis and comprising:
   an elongate stock holder for receiving the stock therein and holding the stock with the stock having an axis colinear with the input axis; and
   an offset adjuster operable to move the holder transverse to the input axis to enable establishment of colinearity of the stock axis with the input axis for separate lengths of stock having different dimensions from stock axis to stock perimeter;
   the holder including a trough for supporting the stock, and a guide associated with the trough to confine the stock against the trough;
   the adjuster being coupled to the trough and to the guide and operable to move both the trough and guide simultaneously but in opposite directions to adapt the holder to different sizes of stock.

2. The apparatus of claim 1 and wherein:
   the adjuster is coupled to the trough and guide with means adapted to move the trough a greater distance than the guide.

3. The apparatus of claim 1 and wherein the adjuster includes:
   first and second cams;
   first and second cam followers engaging the first and second cams, respectively;
   the trough being connected to the first cam follower;
   the guide being connected to the second cam follower; and
   an operator coupled to said first and second cams and operable, when actuated, to cause said cams to drive said followers simultaneously to cause said trough and said guide to move in opposite directions transverse to the input axis.

4. The apparatus of claim 3 and further comprising:
   first and second slides connected to the first and second cam followers, respectively;
   first and second guides fittingly receiving, respectively, the first and second slides to guide and confine movement of the slides to directions transverse to the input axis.

5. The apparatus of claim 4 and wherein: the operator is a screw.

6. The apparatus of claim 4 and wherein:

the trough is V-shaped and upwardly opening; and
the guide is vertically spaced above and centered over the bottom of the trough.

7. The apparatus of claim 4 and wherein:
the trough and guide have longitudinal axes lying in a central plane containing the input axis;
the first cam is a key lying in a cam plane that is parallel to the central plane and the key is inclined in a positive direction, with respect to the input axis;
the second cam is a second key lying in a cam plane that is parallel to the central plane and the second key is inclined in a negative direction with respect to the input axis;
the first slide has a keyway thereon fittingly and guidingly receiving the first cam key therein; and
the second slide has a keyway thereon fittingly and guidingly receiving the second cam key therein.

8. The apparatus of claim 7 and further comprising:
a stock size adapter slide operable longitudinally parallel to the input axis and having the first and second cam keys thereon.

9. The apparatus of claim 7 and wherein:
the keyways on the slides are in inserts fittingly received in the slides and pivotable therein to readily but fittingly slidably receive the respective keys therein.

10. The apparatus of claim 9 and wherein:
the inserts are cylinders in the slides.

11. The apparatus of claim 10 and wherein:
the slides are made of metal and the inserts are made of plastic.

12. Holder apparatus for elongate stock while feeding to a processing station having an input axis and comprising:
an elongate stock holder for receiving the stock therein and holding the stock with the stock having an axis colinear with the input axis;
an offset adjuster operable to move the holder transverse to the input axis to enable establishment of colinearity of the stock axis with the input axis for separate lengths of stock having different dimensions from stock axis to stock perimeter;
the holder including a trough for supporting the stock, and a guide associated with the trough to confine the stock against the trough; and
a guide mount,
the guide being connected to the mount by at least two links and movable thereon in parallelogram manner,
the adjuster being coupled to the trough and to the guide mount and operable, when actuated, to move the trough and the guide mount simultaneously and transversely but in opposite directions relative to the input axis.

13. The apparatus of claim 12 and further comprising:
a quick lock and release device on the guide mount and guide to release the guide for replacement of stock in the trough without operation of the adjuster.

14. Holder apparatus for elongate stock while feeding to a processing station having an input axis and comprising:
an elongate stock holder for receiving the stock therein and holding the stock with the stock having an axis colinear with the input axis;
an offset adjuster operable to move the holder transverse to the input axis to enable establishment of colinearity of the stock axis with the input axis for separate lengths of stock having different dimensions from stock axis to stock perimeter;
a stock pusher carriage mounted for movement parallel to the holder and guidedly movable along the holder;
a pusher member on the carriage and extending in the holder to engage stock received in the holder and operable, when the carriage is driven along the holder toward a processing station, to drive the stock into the processing station, the pusher member including;
a blade clamped in the carriage; and
a rod extending longitudinally in the holder, the blade being received in a transverse groove in the rod to drive the rod longitudinally.

15. The apparatus of claim 14 and wherein:
the carriage includes a wedge and clamping screw and is operable when clamped to drive the wedge against the blade in a direction parallel to the input axis.

* * * * *